(12) United States Patent
Short et al.

(10) Patent No.: US 7,857,270 B2
(45) Date of Patent: Dec. 28, 2010

(54) TILTING MECHANISM

(75) Inventors: Mark Short, West Midlands (GB); Kenneth Gary Nicholls, West Midlands (GB); Raymond Worrall, West Midlands (GB)

(73) Assignee: AVF Group Limited, Telford, Shropshire (GB)

( * ) Notice: Subject to any disclaimer, the term of this patent is extended or adjusted under 35 U.S.C. 154(b) by 889 days.

(21) Appl. No.: 11/506,527

(22) Filed: Aug. 17, 2006

(65) Prior Publication Data

US 2007/0041150 A1 Feb. 22, 2007

(30) Foreign Application Priority Data

Aug. 18, 2005 (GB) ................. 0516913.1

(51) Int. Cl.
*E04G 3/00* (2006.01)
(52) U.S. Cl. ............ 248/284.1; 248/286.1; 248/292.14; 248/919; 248/923
(58) Field of Classification Search ............. 248/274.1, 248/917, 919, 920, 923, 371, 397, 284.1, 248/286.1, 292.14; 361/679.02, 679.22, 361/679.58; 108/5
See application file for complete search history.

(56) References Cited

U.S. PATENT DOCUMENTS

| | | | |
|---|---|---|---|
| 2,791,388 A | 5/1957 | Hirt | |
| 2,965,339 A | 12/1960 | Denton | |
| 3,155,358 A | 11/1964 | Carlson | |
| D218,016 S | 7/1970 | Hobrebe | ....................... D8/363 |
| 4,148,453 A | 4/1979 | Brantly | |
| 4,441,432 A * | 4/1984 | Carlton | ........................... 108/5 |
| D349,640 S | 8/1994 | Whitaker | ..................... D9/363 |
| D352,652 S | 11/1994 | Vogels | .......................... D8/363 |
| 5,372,347 A * | 12/1994 | Minnich | ..................... 248/371 |
| D406,228 S | 3/1999 | Vogels | .......................... D8/363 |
| D411,098 S | 6/1999 | Vogels | .......................... D8/363 |
| 5,941,497 A * | 8/1999 | Inoue et al. | ................. 248/514 |
| 6,279,257 B1 | 8/2001 | Lemire | |

(Continued)

FOREIGN PATENT DOCUMENTS

CA 2512685 A1 1/2004

(Continued)

OTHER PUBLICATIONS

GB Search Report; Appl. No. GB0616387.7; date of Search Dec. 15, 2006; 1 pp.

(Continued)

*Primary Examiner*—Anita M King
(74) *Attorney, Agent, or Firm*—Wells St. John, P.S.

(57) ABSTRACT

A tilting mechanism comprises a first component intended to mount a flat panel display and a second component intended to be secured to a support. The first component has first and second pivots and the second component has first and second elongated slots into which the first and second pivots respectively are received so that the first component can be moved relative to the second component to adjust, in use, the tilt of the flat panel display. In use, an upper one of the elongated slots extends at an angle upwardly and forwardly of the second component, while the lower one of the elongated slots extends upright or upwardly and rearwardly of the second component.

21 Claims, 6 Drawing Sheets

U.S. PATENT DOCUMENTS

| | | |
|---|---|---|
| 6,402,109 B1 * | 6/2002 | Dittmer .................. 248/284.1 |
| 6,554,242 B2 | 4/2003 | Kim |
| 6,604,722 B1 | 8/2003 | Tan |
| D488,708 S | 4/2004 | Lam et al. .................... D8/363 |
| 6,905,101 B1 | 6/2005 | Dittmer |
| 7,070,156 B2 | 7/2006 | Liao |
| 7,152,836 B2 | 12/2006 | Pfister et al. |
| 7,178,775 B2 | 2/2007 | Pfister et al. |
| 7,300,029 B2 | 11/2007 | Petrick et al. |
| 7,316,379 B1 | 1/2008 | Graham |
| 7,334,765 B2 | 2/2008 | Hwang |
| 7,438,269 B2 * | 10/2008 | Pfister et al. ........... 248/292.14 |
| 7,513,474 B2 * | 4/2009 | Anderson et al. ........ 248/284.1 |
| 7,641,163 B2 * | 1/2010 | O'Keene ............... 248/292.14 |
| 2004/0118987 A1 | 6/2004 | Matko et al. |
| 2004/0245420 A1 | 12/2004 | Pfister et al. |
| 2005/0263659 A1 | 12/2005 | Pfister et al. |
| 2006/0226326 A1 | 10/2006 | Asamarai et al. |
| 2007/0041213 A1 | 2/2007 | Short |
| 2007/0176067 A1 * | 8/2007 | Monaco .................. 248/284.1 |
| 2007/0194196 A1 | 8/2007 | Pfister et al. |
| 2008/0192418 A1 * | 8/2008 | Zambelli et al. ............ 361/681 |
| 2008/0315049 A1 * | 12/2008 | Bailo et al. .............. 248/176.1 |

FOREIGN PATENT DOCUMENTS

| | | |
|---|---|---|
| EP | 1618329 A2 | 1/2006 |
| EP | 1812745 A1 | 8/2007 |
| EP | 06254344.2-1252 | 4/2010 |
| GB | 0516913.1 | 8/2005 |
| GB | 0516914.9 | 8/2005 |
| JP | 2006526163 | 11/2006 |
| JP | 2007102247 | 4/2007 |
| WO | WO 2004/063619 A2 | 7/2004 |
| WO | WO 2006/044969 A1 | 4/2006 |
| WO | WO 2006/095379 A1 | 9/2006 |

OTHER PUBLICATIONS

European Search Report for Application No. 06254364.0-1252; mailed Jul. 17, 2007; 7 pp.

Extended European Search Report for EP Application No. 06254344.2; mailed Aug. 7, 2007; 7 pp.

* cited by examiner

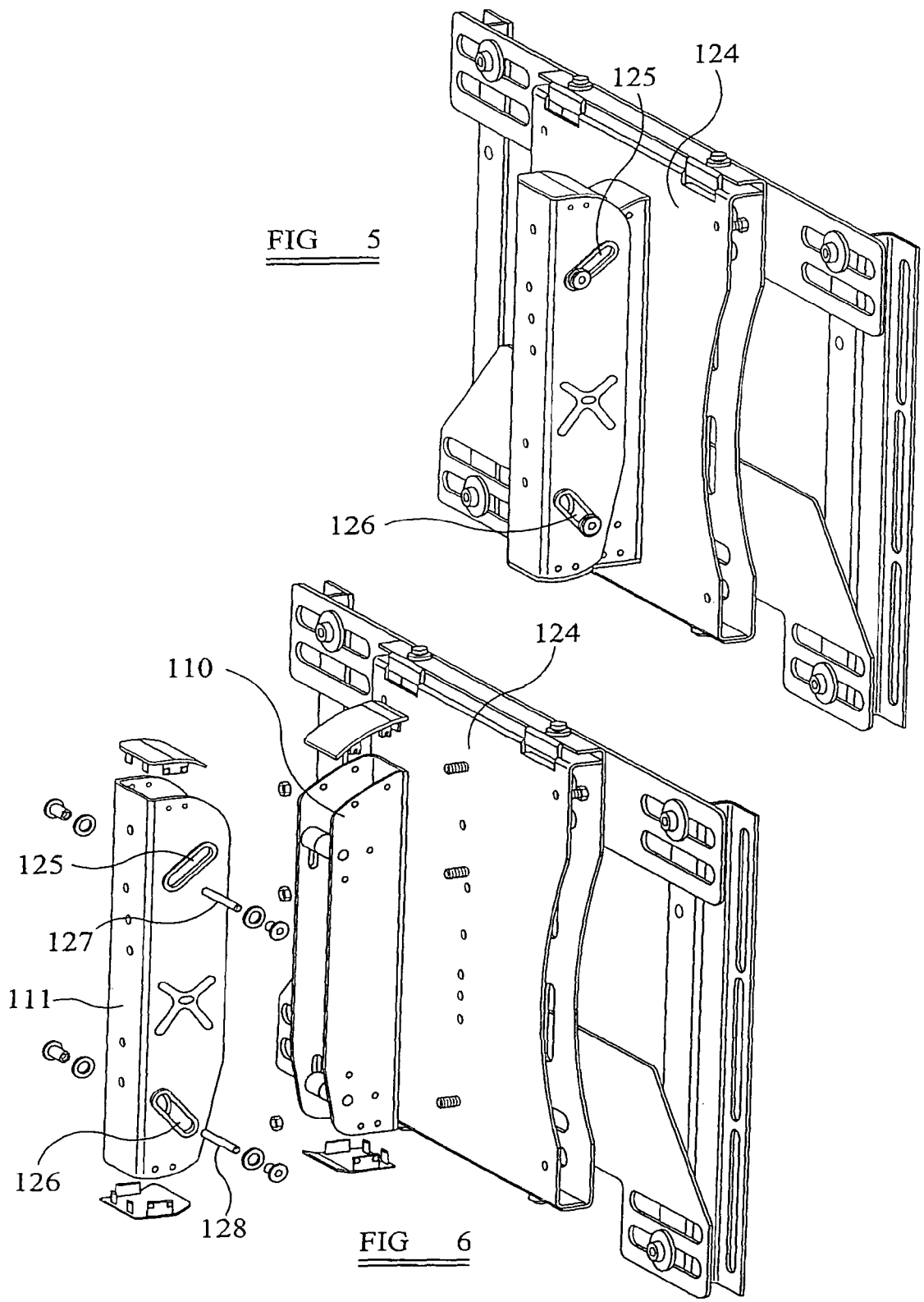

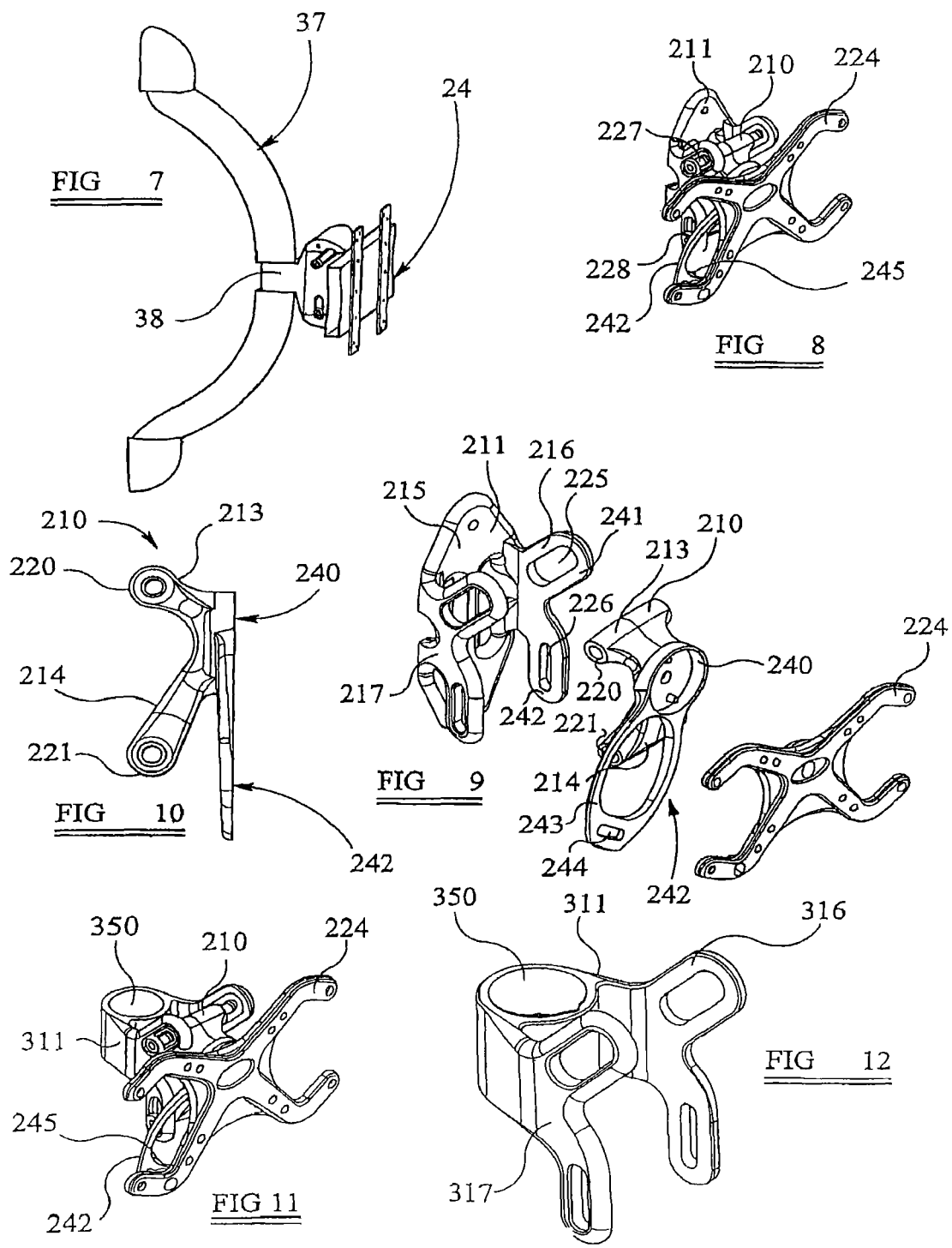

007
TILTING MECHANISM

CROSS REFERENCE TO RELATED APPLICATION

This application relates to and claims priority to corresponding Great Britain Patent Application No. 0516913.1, which was filed on Aug. 18, 2005, and which is incorporated by reference herein.

BACKGROUND OF THE DISCLOSURE

This invention relates to a tilting mechanism for flat panel displays, such as computer monitors and also liquid crystal and plasma television sets, and has as an object the provision of a simple yet effective tilting mechanism to allow adjustment of the position of the display.

SUMMARY OF THE DISCLOSURE

According to the invention there is provided a tilting mechanism comprising a first component intended to mount a flat panel display, a second component intended to be secured to a support, the first component having first and second pivots, the second component having first and second elongated slots therein into which the first and second pivots respectively are received so that the first component can be moved relative to the second component to adjust, in use, the tilt of the flat panel display, wherein, in use, an upper one of the elongated slots extends at an angle upwardly and forwardly of the second component, while the lower one of the elongated slots extends upright or upwardly and rearwardly of the second component.

By virtue of the slot arrangement as the first component moves with respect to the second component, the weight of the display is balanced in any one of the adjusted positions of tilt.

In one embodiment, the first component has a pair of spaced parallel sides which carry the first and second pivots and the second component has a pair of spaced parallel sides each of which include first and second elongate slots as defined above. Preferably the sides of the first component are received between the sides of the second component, so as to be disposed adjacent thereto respectively. Desirably the first and second pivots each comprise a pivot pin. An upper one of the pivots has its pin extending through respective upper openings in the side walls of the first component and into said upper slots in the sidewalls of the second component for sliding therealong, while the lower one of the pivots has its pin extending through respective lower openings in the side walls of the first component and into the lower slots in the sidewalls of the second component for sliding therealong.

In another embodiment, the first component has a pair of vertically spaced arms which carry the first and second pivots and the second component has a pair of spaced parallel sides each of which include first and second elongate slots as defined above. Preferably the sides of the second component are configured with vertically spaced arms for accommodating, respectively, the upper and lower elongate slots. Desirably the first and second pivots each comprise a pivot pin. An upper one of the pivots has its pin extending through respective openings in the upper arm of the first component and into said upper slots in the sidewalls of the second component for sliding therealong, while the lower one of the pivots has its pin extending through respective openings in the lower arm of the first component and into the lower slots in the sidewalls of the second component for sliding therealong.

In either of the above embodiments, the pivot pin is screw-threaded at least at its opposite ends and respective barrel nuts are engaged thereon to tighten the mechanism and lock the first and second components together in their relatively adjusted position. Preferably, the barrel nuts also provide a smooth surface for sliding along the respective slots in the second component. Spacer means may be provided between the first and second components around the pivot pins respectively to prevent over locking. Preferably, the second component is configured for mounting on a vertical support surface. Alternatively, the second component is configured for mounting on a supporting arm. In this case, the second component may be configured for pivotal engagement with the supporting arm. Preferably, the first component further includes a means for adjusting the roll of a flat panel display when mounted thereon. The term roll being used herein to denote movement about a horizontal axis, as is commonly understood by the term roll when describing degrees of freedom, the other degrees of freedom being pitch and yaw. Preferably, the means for adjusting the roll comprises at least one screw engaged through a generally vertically extending slot in the first component and into a complementary screw thread on a display mounting component, such that roll of the mounting component and thereby the display can be adjusted by movement of the screw along the slot.

BRIEF DESCRIPTION OF THE DRAWINGS

The invention will now be described, by way of example, with reference to the accompanying drawings, in which:

FIG. 5 is a rear perspective view of a second embodiment of a tilting mechanism of the invention, having an adjustable mount secured thereto, FIG. 6 is an exploded view corresponding to FIG. 5, FIG. 7 is a side perspective view of the tilting mechanism and adjustable mount of FIGS. 1 and 2 secured to an arcuate mounting arm, FIG. 8 is a front perspective view of a third embodiment of a tilting mechanism of the invention having an adjustable mount secured thereto, FIG. 9 is an exploded view corresponding to FIG. 8, FIG. 10 is a side view of a tilt component of the tilting mechanism shown in FIGS. 8 and 9, FIG. 11 is a front perspective view of the tilting mechanism and adjustable mount of FIGS. 8 and 9 configured for mounting on a supporting arm, FIG. 12 is a front perspective view of a part of the tilting mechanism of FIG. 11 configured for mounting on a supporting arm;

DETAILED DESCRIPTION OF THE DISCLOSURE

Figures 1, 2:
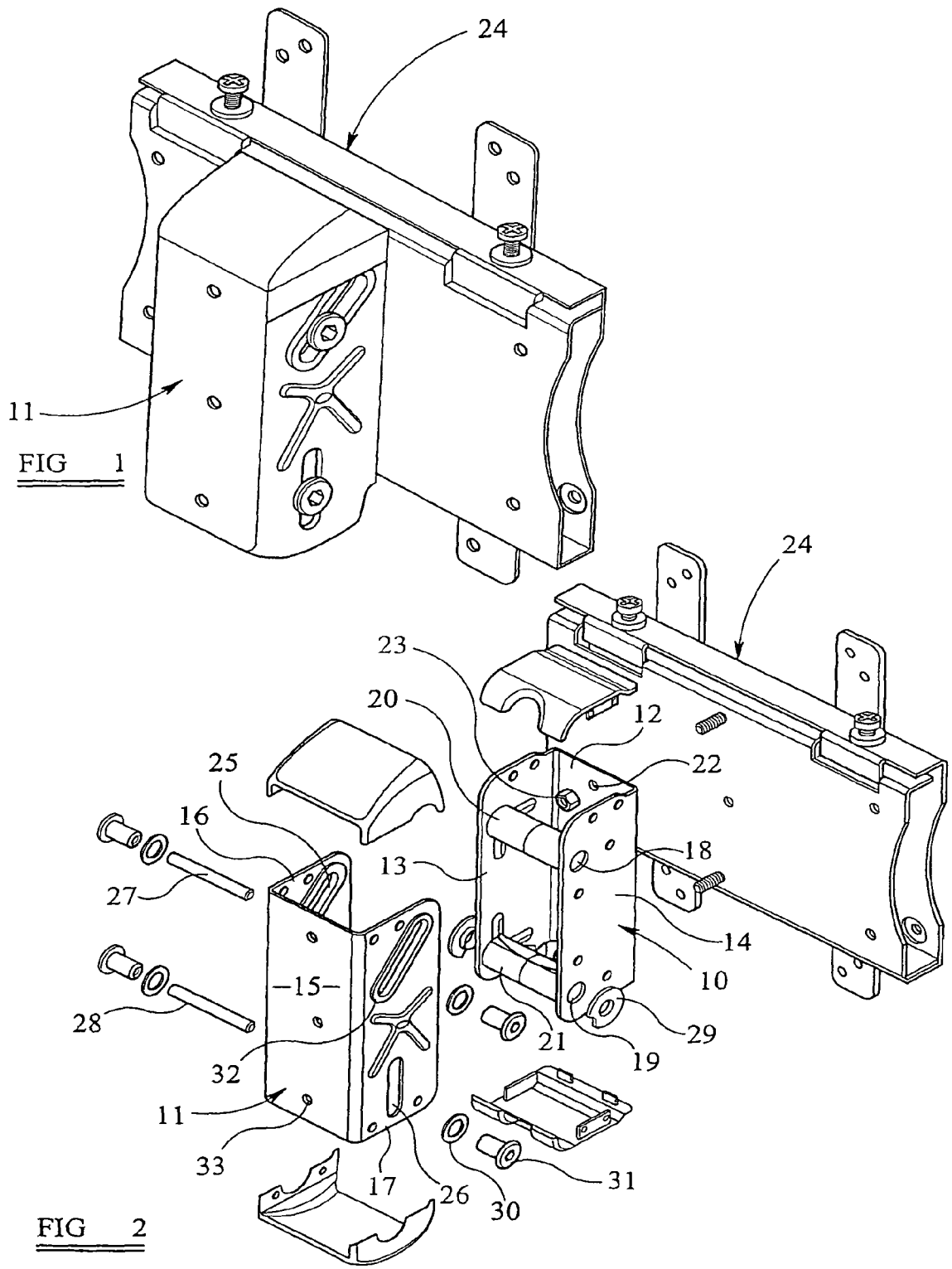
FIG. 1 is a rear perspective view of a first embodiment of a tilting mechanism of the invention having an adjustable mount secured thereto.
FIG. 2 is an exploded view corresponding to FIG. 1.

A first embodiment of a tilting mechanism of the invention shown in FIGS. 1 and 2 comprises a first component in the form of a U-shaped bracket 10, and a second component in the form of a similar but larger U-shaped bracket 11. In this embodiment both of brackets 10 and 11 are of one piece form and are preferably formed of mild steel. The bracket 10 comprises a rectangular base 12 with parallel spaced rectangular side walls 13, 14 respectively extending at 90° from the base 12. The bracket 11 is of similar form, having a rectangular base 15 and parallel spaced rectangular side walls 16, 17 respectively extending at 90° from the base 15. However the base 15 is slightly wider than the base 12 so that the side walls 13, 14 can be received in the space between the side walls 16, 17, the relative sizes of the two brackets being such that in this position the outer surface of the side wall 14 is closely adjacent to but slightly spaced from the interior surface of the side wall 17. Similarly the exterior surface of the side wall 13 is closely adjacent to, but slightly spaced from the internal surface of the side wall 16 so that, as will be described, the part of the bracket 10 between the side walls 16 and 17 can slide relative to the bracket 11 as will be described hereinafter.

As can be seen in FIG. 2, the side wall 14 has a pair of vertically spaced apart circular openings 18, 19 respectively therein, each opening lying close to the longitudinal free edge of the side wall. Similarly upper and lower circular openings are provided in the opposite side wall 13, with the upper opening inside wall 13 being aligned with the upper opening 18 in side wall 14, and the lower circular opening in side wall 13 being aligned with the lower opening 19 in the side wall 14. Between the upper pair of openings in the respective side walls 13 and 14 is received a concentric hollow cylindrical plastics material spacer 20, the respective opposite ends of which are either in contact with the respective inner surfaces of the side walls 13 and 14 or are very close thereto. Similarly an identical spacer 21 is, as shown in FIG. 2, received at the location of the pair of lower circular openings in the side walls 13 and 14 respectively. Instead of being a single spacer, the space between the respective side walls 13 and 14 could in each case be bridged by two or more such spacers on a common axis coincident with the respective axis of each pair of upper and lower openings respectively. The base 12 of the bracket 10 is provided with upper and lower circular openings, one of which 22 is shown in FIG. 2. It is intended that a flat panel display screen is secured either directly or indirectly to the exterior face of the base 12, and these openings in the base are to receive threaded fixing means which are then secured to the bracket 10 by nuts such as the nut 23 shown in FIG. 2. In the embodiment shown in FIG. 2, the screen is indirectly mounted to the bracket 10 via the intermediary of an adjustable mount 24 which forms the subject of our co-pending UK patent application number GB0516914.9. By this means a tilting adjustment of the bracket 10 relative to the bracket 11, as will be described hereinafter, causes corresponding tilting of the flat panel display carried by the adjustable mount 24.

The bracket 11 is provided in each of its side walls with an upper elongated slot 25 and a lower elongated slot 26. The upper slots in the two side walls 16, 17 respectively are aligned, while similarly the lower elongated slots in the two side walls 16, 17 respectively are also aligned so that, as will be described, an upper circular pivot pin 27 can have its opposite ends received in the respective upper slots while a lower circular pivot pin 28 can have its opposite ends received in the respective lower elongated slots. The pivot pin 27, which can be threaded, at least at its opposite ends, is received through the spacer 20, and thus through the upper openings in the respective side walls 13, 14, while the lower pivot pin 28, which can also be threaded, at least at its opposite ends, is received through the spacer 21 and thus through the lower aligned circular openings in the respective side walls 13, 14. In this way the two brackets 10 and 11 are adjustably connected together. As can be seen from FIG. 2, respective nylon washers 29 can be received on the respective opposite ends of at least the lower pivot pin between the outside surfaces of the respective side walls 13, 14 and the respective inner surfaces of the side walls 16, 17.

As can be seen from FIGS. 1 and 2, each of the upper slots 25 are angled upwardly and forwardly relative to the base when the bracket 11 is orientated as shown. In contrast the lower elongated slots, which are disposed substantially centrally of the width of the side walls 16, 17 respectively, and which like the slots 25 are straight, are disposed upright, i.e. parallel to the respective junction lines between the base 15 and the respective side walls 16, 17, and indeed effectively parallel to the base itself.

Fitted on the respective opposite ends of the lower pivot pin 28, at the respective outer surfaces of the side walls 16, 17 are nylon washers 30 and barrel nuts 31. The barrel nuts 31 provide a smooth surface within the slots 26 such that the ends of the pivot pin 28 disposed within the barrel nuts 31 can slide easily along the slots 26. Similar washers and barrel nuts may also be provided for the upper pivot pin 27 so that the ends of the upper pivot pin 27 disposed within its respective the barrel nuts 31 can slide easily along the slots 25. Finally with regard to the bracket 11, it will be noted that respective friction bushes 32 are fitted in the elongated slots 25, while fixing openings 33 are provided in the base 15, for fixing means to secure the bracket to a component, as will be described.

Finally with regard to the mechanism, it will be noted that each of the brackets may be provided with upper and lower caps, which may be decorative, and conceal from view the components within said brackets.

It is believed that from the above it will be apparent that when the mechanism is assembled with the upper and lower pivot pins in place as described, but with the barrel nut 31 slacked off slightly, the lower pivot pin 28, due to the weight of the flat panel display, is trying to move down to the bottom of its associated slots 26, while at the same time the upper pivot pin 27 is trying to move to the upper end of its associated slots 25. The angle of the slots 25 is selected so that these two tendencies are balanced, thereby preventing movement due to weight in either tilt direction. In this embodiment, it is preferred that there can be a small upward tilt. The bracket 11 could be secured to a vertical wall or similar support surface, or it could be secured to part of a swivel mechanism as will be described in relation to FIGS. 3 and 7.

When it is desired to tilt the flat panel display in a positive direction, i.e. forwards in respect to the top of the screen, it is merely necessary to pull the top of the display forwardly, the bracket 10, as a result, lifting by way of its pivot pins 27 sliding up their associated slots 25. In this position the weight of the flat panel display is balanced and thus again is self holding.

Equally when it is desired to adjust the display in a negative direction, i.e. backwardly in respect to the top of the screen, it is merely necessary to push the top of the display rearwardly, resulting in the panel 10 lowering.

If it is deemed desirable and/or necessary to provide a locking, this is achieved by tightening the barrel nuts 31 when the mechanism is in its adjusted position. The spacers 20 and 21 are provided to prevent over-locking by way of the barrel nuts 31, and thus deformation of the side walls of the two brackets.

Figure 3:
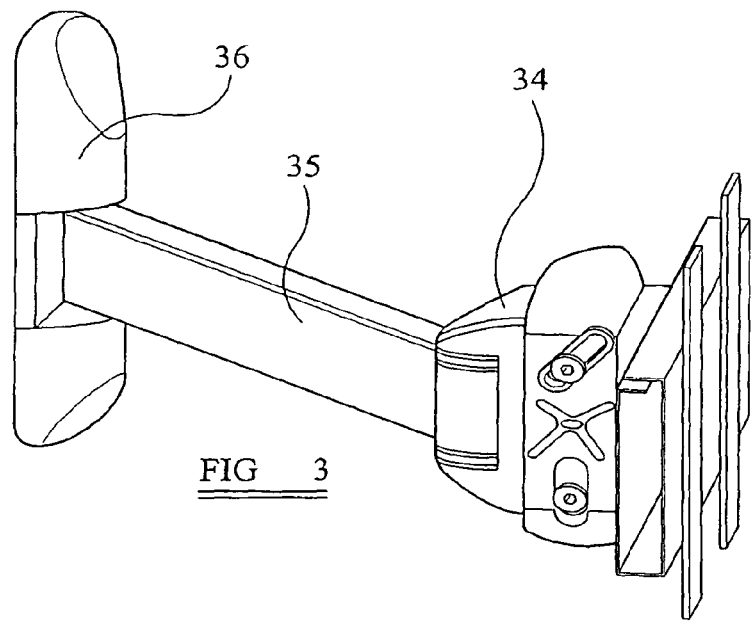
FIG. 3 is a perspective view of the tilting mechanism and adjustable mount of FIG. 1 secured to a pivot arm mechanism.
Figure 4:
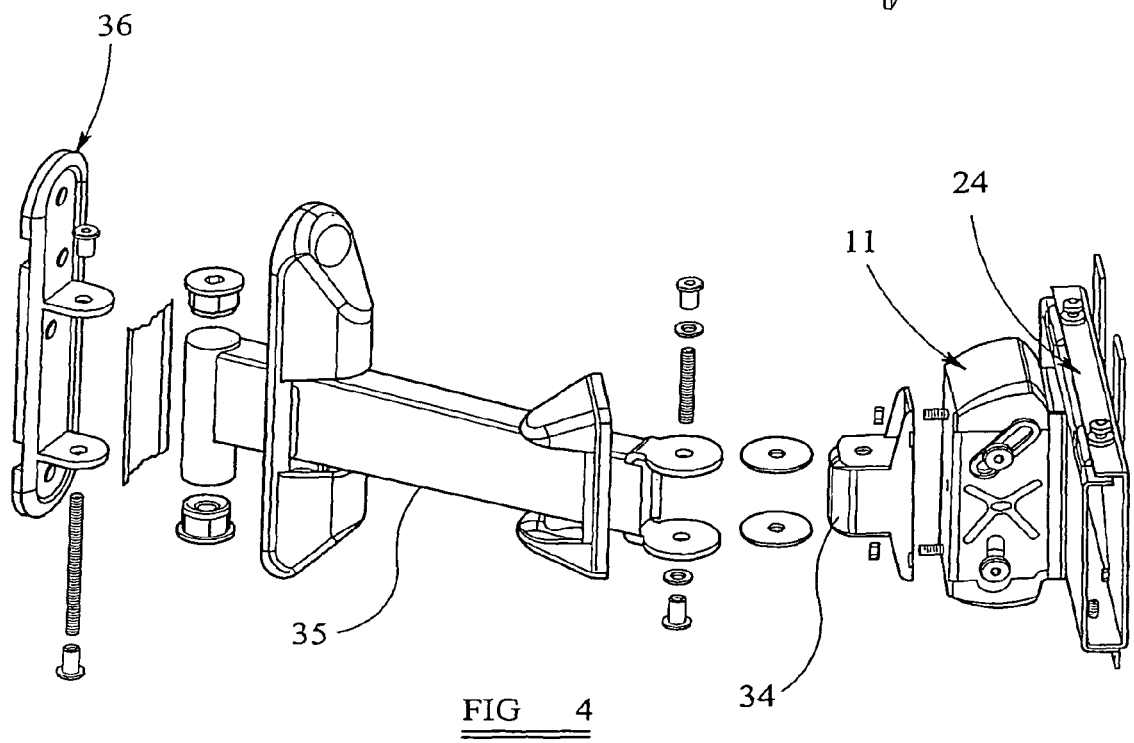
FIG. 4 is an exploded view corresponding to FIG. 3.

As mentioned above, the bracket 11 of the tilting mechanism can be secured to any suitable surface or component, and FIGS. 3 and 4 show this mechanism secured to a pivot bracket 34 which itself is pivotally mounted on the end of a support arm 35 which itself is pivotally mounted at a wall plate 36 which is, in use, secured to a wall or equivalent surface by fixing bolts or the like. The swivelling arrangements shown in FIG. 4 form no part of the present application and will thus not be described. FIGS. 3 and 4 do however illustrate one way in which the bracket 11 of the tilting mechanism can be fixed.

FIGS. 5 and 6 show a second embodiment of a tilting mechanism of the invention, and since many of the component parts are of similar or identical form to those of the first embodiment in FIGS. 1 and 2, identical reference numerals will be used with the prefix 100. It will also be noted that an adjustable mount 124 similar to the adjustable mount 24 of the first embodiment is again secured to the base of the first component of the tilting mechanism, namely the bracket 110. Here however the adjustable mount is provided with a large outer adjustable plate assembly for use with larger sized flat panel displays.

In essence the only real difference between the embodiment of FIGS. 5 and 6 and the embodiment of FIGS. 1 and 2 is that instead of the lower slots denoted by the numeral 26 in the first embodiment being vertical, the equivalent slots denoted by the numeral 126 are now directed upwardly and rearwardly, i.e. in the opposite direction to the upper elongated slots 125 shown in FIGS. 5 and 6.

While the provision of these slots again enables the adjusted flat panel display to be balanced when in its adjusted position, by virtue of the lower pivot pin trying to return to the bottom of its associated slots and the upper pivot pin trying to aid the flat panel display tipping forward, the degree of adjustment with this slot arrangement is somewhat greater than in the first embodiment, in that, in contrast to the first arrangement, it is now possible not only for the top of the panel to tip outwardly, but it is also possible for the bottom of the panel to tip inwardly.

Although the bracket 111 is not shown attached to a wall, an equivalent surface or some component, it will be understood that this bracket can be secured in the same way as the bracket 11 shown in FIGS. 1 to 4.

In fact the tilting mechanism shown in FIGS. 1 to 4 together with the adjustable mount 24 are shown in FIG. 7 secured to a swivel bracket 38 received between a pair of arcuate arms forming part of the composite arcuate mounting arm 37 which is intended to be attached at its upper and lower ends to a wall or equivalent surface. However it will be understood that the tilting mechanism shown in FIGS. 5 and 6 could easily well be attached to the swivel bracket 38 in place of the tilting mechanism shown in FIG. 7.

FIGS. 8 to 10 show a third embodiment of a tilting mechanism of the invention and since many of the component parts are again of similar or identical form to those of the first embodiment in FIGS. 1 and 2, identical reference numerals will be used with the prefix 200. It will be noted that in this embodiment the adjustable pressed mount 24 of the first embodiment has been replaced with an adjustable mount 224 of a cast skeleton design. The mount 224 is substantially X-shaped and includes means for securing a flat panel display to its front surface. The rear of the mount 224 is configured for screw engagement with a first component 210 of the tilting mechanism.

Aside from the differences outlined above in relation to the mounts 24 and 224 of the first and third embodiments, the main difference between the embodiment of FIGS. 8 to 10 and the embodiment of FIGS. 1 and 2 is in the shape and configuration of the first component 210. In the third embodiment, the first component 210 is a cast tilt component with a pair of vertically spaced arms 213 and 214. The upper arm 213 carries a first pivot 220 and the lower arm 214 carries a second pivot 221. The front of the first component 210 comprises a substantially circular recess 240 that is configured for screw engagement with the rear of the mount 224. Depending downwardly from the edge of the recess 240, at an angle from the vertical, is a means 242 for adjusting the roll of a flat panel display when provided on the mount 224. The means 242 comprises a substantially oval shaped support 243 with an open center. An angled slot 244 is provided in the oval support 243, close to its furthest point from the circular recess 240. In use, a screw 245 is engaged through the slot 244 and into a complementary screw thread on the mount 224. Roll, for example to effect horizontal levelling of a mounted flat panel display, is permitted by movement of the screw 245 along the slot 244. Subsequent tightening of the screw 245 fixes the mount 224 in the desired horizontal position.

As in the first embodiment of FIGS. 1 and 2, a second cast component 211 of the third embodiment has a pair of spaced parallel sides 216 and 217, each of which includes respective first and second elongate slots 225, 226. Each side of the second component 211 is configured with respective vertically spaced arms 241 and 242 for accommodating the upper and lower elongate slots 225, 226. The slots 225 and 226 in the third embodiment are orientated in the same manner as those in the first embodiment, that is with the upper slots 225 being directed upwardly and forwardly of the second component 211 and the lower slots 226 being vertical. In an alternative version of the third embodiment the lower slots 226 may be directed upwardly and rearwardly of the second component 211 in a similar manner to the slots 126 shown in FIGS. 5 and 6. A base 215 connects the sides 216 and 217. The base 215 is configured for mounting on a vertical support surface.

The first and second pivots 220, 221 each comprise pivot pins 227 and 228. An upper one of the pivots 220 has its pin 227 extending through respective openings in the upper arm 213 of the first component 210 and into said upper slots 225 in the upper side arms 241 of the second component 211 for sliding therealong, while the lower one of the pivots 221 has its pin 228 extending through respective openings in the lower arm 214 of the first component 210 and into the lower slots 226 in the lower side arms 242 of the second component 211 for sliding therealong.

In an alternative arrangement, the tilting mechanism of FIGS. 8 to 10 is configured for mounting on a supporting arm such as that denoted by numeral 35 in FIGS. 3 and 4. In this case, the second component 311 may be configured for pivotal engagement with the supporting arm and may include a cylindrical tube 350, as shown in FIGS. 11 and 12. The cylindrical tube 350 connects sides 316 and 317 of the second component 311 and effectively replaces the base 215 in FIGS. 8 and 9. All other components in FIGS. 11 and 12 are identical to those of FIGS. 8 to 10.

Figure 13:
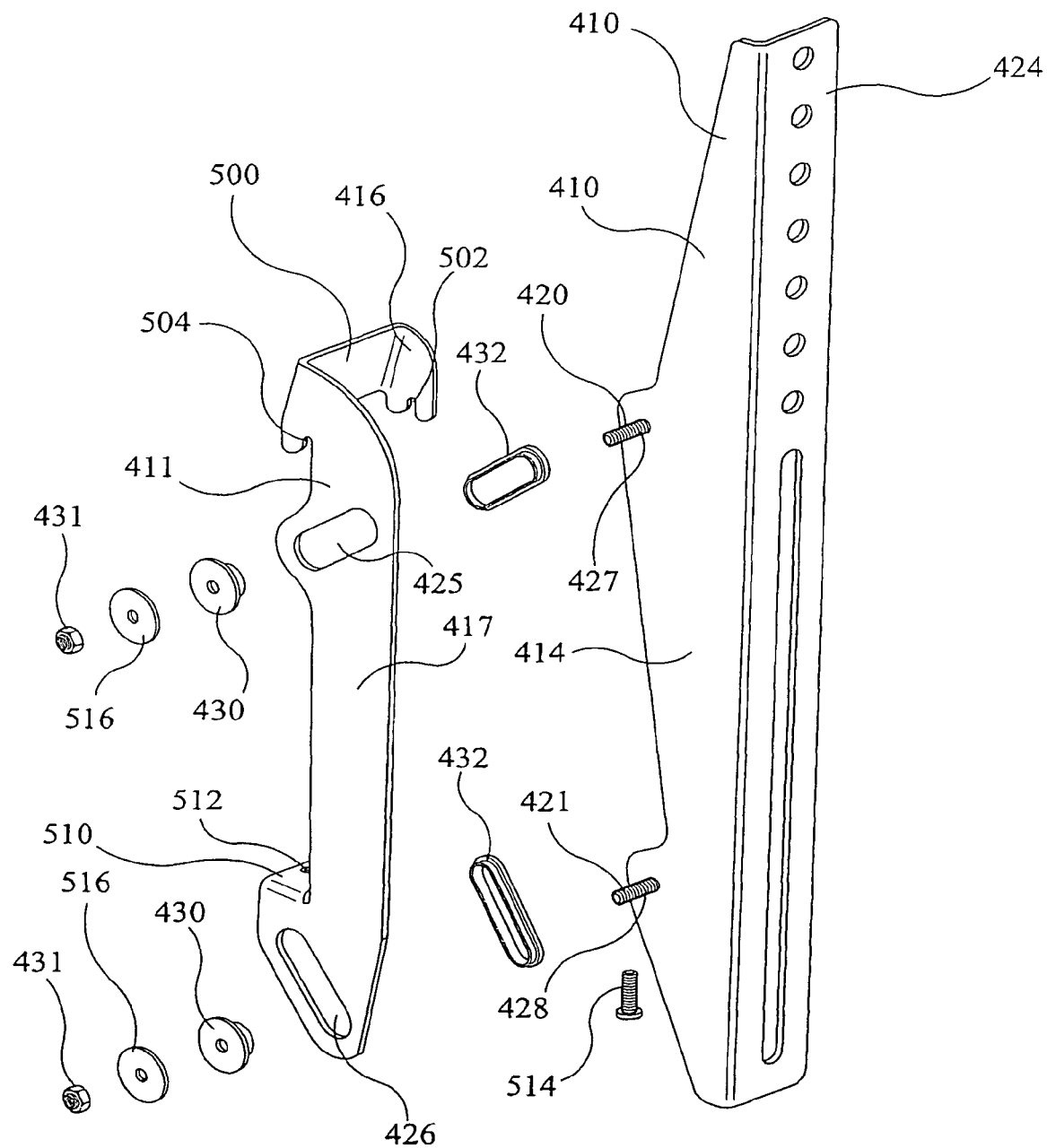
FIG. 13 is an exploded front perspective view of a fourth embodiment of a tilting mechanism according to the present invention.
Figure 14:
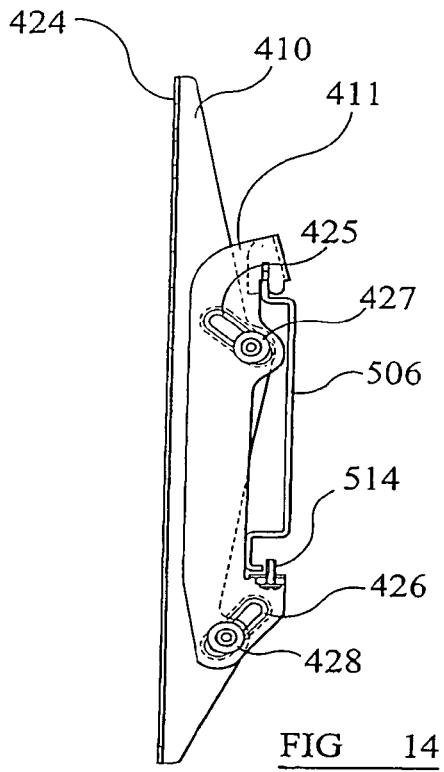
FIG. 14 is a side view of the tilting mechanism of FIG. 13.
Figure 15:
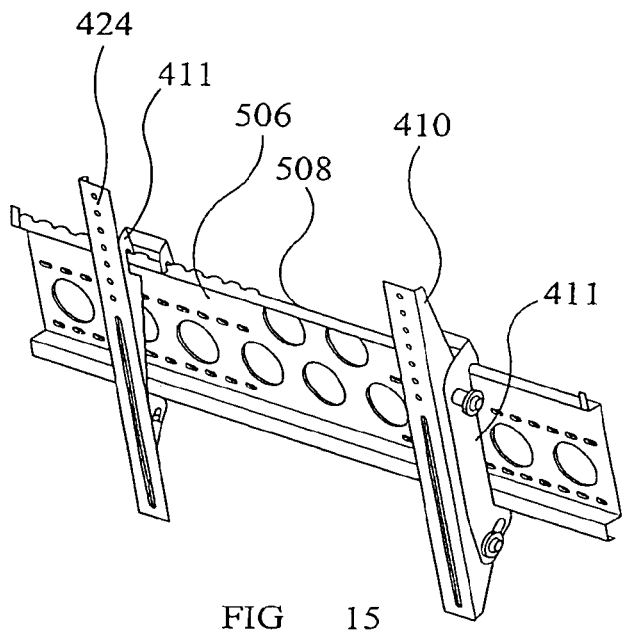
FIG. 15 is a front perspective view of a mount including two opposed tilting mechanisms similar to those of FIG. 13.
Figure 16:
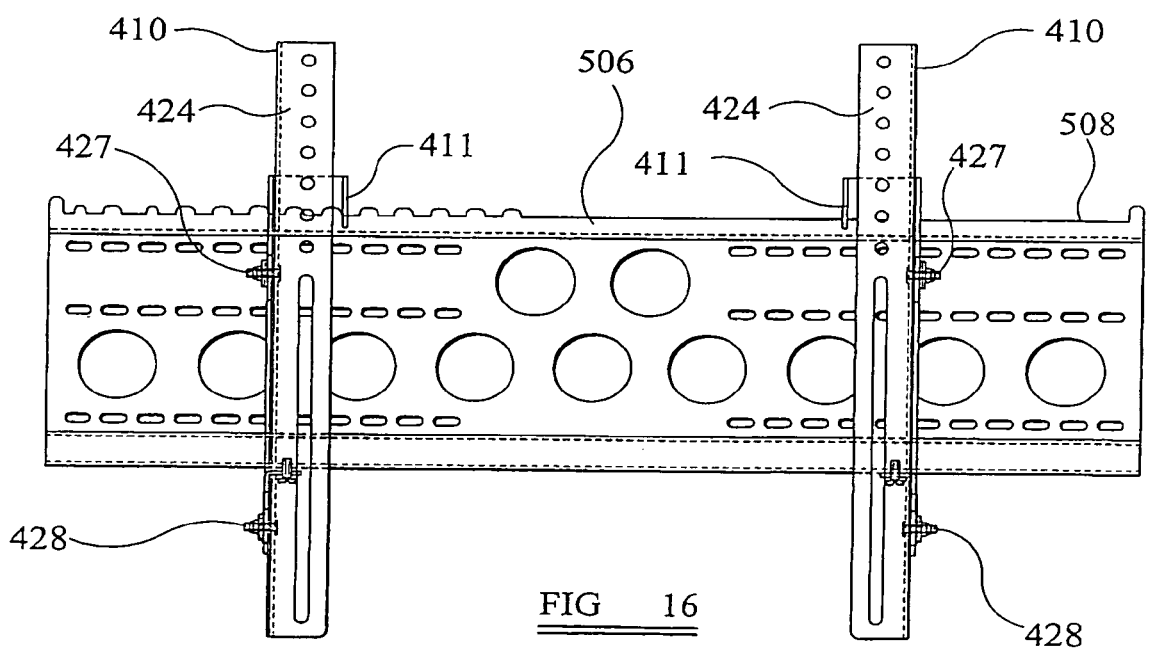
FIG. 16 is a front view of the mount of FIG. 15.

FIGS. 13 through 16 illustrate a fourth embodiment of a tilting mechanism of the invention, and since many of the component parts are of similar or identical form to those of the first embodiment in FIGS. 1 and 2, identical reference numerals will be used with the prefix 400. It will be noted that in this embodiment the second component 411, which is intended to be secured to a support such as a wall, has only a single side 417 that contains an upper slot 425 and a lower slot 426. As for the embodiment of FIGS. 5 and 6, the lower elongate slot 426 on side 417 is directed upwardly and rearwardly of the second component, i.e. in the opposite direction to the upper elongate slot 425, which extends upwardly and forwardly of the second component. Friction bushes 432 are fitted in the elongated slots 425 and 426, respectively. A plate 500 extends substantially perpendicularly to side 417 from its upper extremity. The end of the plate 500 opposite to the side 417 attaches to a short side 416. At the lower extremity of the short side 416 is a vertical recess 502. A corresponding recess 504 is provided in side 417, opposite to recess 502. Thus, as shown in FIGS. 14 to 16, the second component 411 can be mounted on a wall plate 506 by inserting the upper edge longitudinal edge 508 of the wall plate 506 in the recesses 502 and 504 and thereby hanging the second component 411 on the wall plate 506. A substantially horizontal ledge 510 extends perpendicularly from the side 417 close to the upper extremity of the lower slot 426, on the same side as plate 500. The ledge 510 includes a vertically threaded bore 512 for engagement with a screw 514. As shown in FIG. 14, once the second component 411 has been hung on the wall plate 506, the screw 514 is threaded into the bore 512 and extends upwardly behind the rear of the wall plate 506, thereby locking the second component in engagement with the wall plate 506.

In this embodiment, the first component 410 includes first and second pivots 420, 421 each in the form of pivot pins 427 and 428. As shown in FIG. 14, an upper one of the pivots 420 has its pin 427 extending through the upper slot 425 in side 417 of the second component 411 for sliding therealong, while the lower one of the pivots 421 has its pin 428 extending through the lower slot 426 in side 417 of the second component 411 for sliding therealong. The pivots 420 and 421 extend generally perpendicularly from a side 414 of the first component 410. A mount 424 is provided at the front of the first component 410 in the form an elongate plate extending perpendicularly from the front edge of side 414.

When assembled, the respective free ends of the upper and lower pivot pins 427, 428 are fitted, at the outer surface of the side wall 417 with nylon washers 430, metal washers 516 and lock nuts 431. The nylon washers 430 are each provided with a shoulder that is configured to sit within the bushes 432 to provide a smooth surface within the slots 425, 426 such that the portion of the pivot pins 427, 428 disposed within the shoulders of the washers 430 can slide easily along the respective slots 425, 426. The operation of the tilting mechanism is as described above. The lock nuts 431 may be tightened to lock the pivot pins 427, 428 in the desired positions within the slots 425, 426 to hold the mount 424 in the desired tilt position.

Although a single tiling mechanism as shown in FIGS. 13 and 14 can be employed, it may be desirable to use two spaced apart, opposed tilting mechanisms as shown in FIGS. 15 and 16. More than two tilting mechanisms may also be employed along the length of a flat screen display, particularly if the display is long and heavy.

In the first embodiment of the invention, the pivot pins 27, 28 retain the barrel nuts 31 within the respective slots 25, 26 (or bushes 32). When sliding within the slots 25, 26, (or bushes 32) the barrel nuts 31 are free to rotate, with the pivot pins 27, 28, relative to the first component 10. A similar arrangement is also provided in the second and third embodiments. As for the fourth embodiment, the pivot pins 427, 428 are fixedly attached to the first component 410. However, the nylon washers 430 are free to rotate relative to the first component 410 as the pivot pins 427, 428 slide along the respective slots 427, 428 (or bushes 432).

The invention claimed is:

1. A tilting mechanism comprising a first component configured to mount a flat panel display, a second component configured to be secured to a support, the first component having first and second pivots, the second component having first and second elongated slots therein into which the first and second pivots respectively are received so that the first component can be moved relative to the second component to adjust, in use, the tilt of the flat panel display, wherein, in use, an upper one of the elongated slots extends at an angle upwardly and forwardly of the second component, while a lower one of the elongated slots extends upright or upwardly and rearwardly of the second component, and wherein the angle of said upper one of the elongated slots is selected such that the flat panel display is balanced and therefore self-holding in any selected position of tilt.

2. A tilting mechanism according to claim 1 wherein the first component has a pair of spaced parallel sides which carry the first and second pivots and the second component has a pair of spaced parallel sides each of which include the first and second elongated slots and wherein, in use, each side has the upper one of the elongated slots extending at the angle upwardly and forwardly of the second component, while the lower one of the elongated slots extends upright or upwardly and rearwardly of the second component.

3. A tilting mechanism according to claim 2 wherein the sides of the first component are received between the sides of the second component, so as to be disposed adjacent thereto respectively.

4. A tilting mechanism according to claim 3 wherein the first and second pivots each comprise a pivot pin.

5. A tilting mechanism according to claim 4 wherein an upper one of the pivots has its pin extending through respective upper openings in the sides of the first component and into each of the upper slots in the sides of the second component for sliding therealong, while a lower one of the pivots has its pin extending through respective lower openings in the sides of the first component and into each of a plurality of lower ones of the slots in the sides of the second component for sliding therealong.

6. A tilting mechanism according to claim 4 wherein the pivot pin is screw-threaded at least at its opposite ends and respective barrel nuts are engaged thereon to tighten the mechanism and lock the first and second components together in their relatively adjusted position.

7. A tilting mechanism according to claim 6 wherein the barrel nuts are configured with a smooth surface for sliding along the respective slots in the second component.

8. A tilting mechanism according to claim 4 wherein spacer means is provided between the first and second components around the pivot pins respectively to prevent over locking.

9. A tilting mechanism according to claim 1 wherein the first component has a pair of vertically spaced arms which carry the first and second pivots and the second component has a pair of spaced parallel sides each of which include the first and second elongated slots in accordance with claim 1.

10. A tilting mechanism according to claim 9 wherein the first component further includes means for adjusting the roll of a flat panel display when mounted thereon.

11. A tilting mechanism according to claim 10 wherein the means for adjusting the roll comprises at least one screw engaged through a slot in the first component and into a complementary screw thread on a display mounting component, such that roll of the mounting component and thereby the display can be adjusted by movement of the screw along the slot.

12. A tilting mechanism according to claim 9 wherein the sides of the second component are configured with vertically spaced arms for accommodating, respectively, the upper and lower elongated slots.

13. A tilting mechanism according to claim 12 wherein the first and second pivots each comprise a pivot pin.

14. A tilting mechanism according to claim 13 wherein an upper one of the pivots has its pin extending through respective openings in an upper arm of the first component and into said upper slots in the sides of the second component for sliding therealong, while a lower one of the pivots has its pin extending through respective openings in a lower arm of the first component and into the lower slots in the sides of the second component for sliding therealong.

15. A tilting mechanism according to claim 1 wherein the second component is configured for mounting on a vertical support surface.

16. A tilting mechanism according to claim 1 wherein the second component is configured for mounting on a supporting arm.

17. A tilting mechanism according to claim 16 wherein the second component is configured for pivotal engagement with the supporting arm.

18. A tilting mechanism according to claim 1 wherein the elongated slots are void of notches.

19. A tilting mechanism according to claim 1 wherein the upper one of the elongated slots is configured to provide a balance of the first component against a downward gravitational force wherein the flat panel display is balanced in any position of the first pivot in the upper one of the elongated slots.

20. A tilting mechanism according to claim 1 wherein the first and second components are configured to tilt a front of the flat panel display downwardly.

21. A tilting mechanism according to claim 1 wherein the tilting mechanism is configured to tilt the flat panel display about a pivot point which is configured to move upwardly as an upper portion of the flat panel display is tilted forwardly.

* * * * *